United States Patent
Hatim (10) Patent No.: US 10,830,179 B2
(45) Date of Patent: Nov. 10, 2020

(54) VARIABLE BLEED VALVE DOOR ASSEMBLY AND SYSTEM FOR GAS TURBINE ENGINES

(71) Applicant: General Electric Company, Schenectady, NY (US)

(72) Inventor: Ami Hatim, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 212 days.

(21) Appl. No.: 15/907,363

(22) Filed: Feb. 28, 2018

(65) Prior Publication Data

US 2018/0252184 A1 Sep. 6, 2018

(30) Foreign Application Priority Data

Mar. 1, 2017 (IN) .............................. 201741007280

(51) Int. Cl.
*F02C 6/08* (2006.01)
*F02K 3/075* (2006.01)
(Continued)

(52) U.S. Cl.
CPC ............ *F02K 3/075* (2013.01); *F01D 17/105* (2013.01); *F02C 9/18* (2013.01); *F02C 6/08* (2013.01);
(Continued)

(58) Field of Classification Search
CPC ..... F02K 3/00; F02K 3/02; F02K 3/04; F02K 3/06; F02K 3/075; F02C 3/13; F02C 6/08;
(Continued)

(56) References Cited

U.S. PATENT DOCUMENTS 3,638,428 A * 2/1972 Shipley .................. F02K 3/075
60/226.1
3,964,257 A 6/1976 Lardellier
(Continued)

FOREIGN PATENT DOCUMENTS

| CN | 102171415 A | 8/2011 |
|---|---|---|
| CN | 104718371 A | 6/2015 |

(Continued)

OTHER PUBLICATIONS

National Intellectual Property Administration, P.R. China, "First Office Action," dated Dec. 9, 2019 in connection with Chinese Patent Application No. 201810171660.4, 12 pages (English translation provided).

(Continued)

*Primary Examiner* — William H Rodriguez
(74) *Attorney, Agent, or Firm* — Hanley, Flight & Zimmerman, LLC (57) ABSTRACT

A variable bleed valve system for use in a turbofan engine includes a plurality of circumferentially spaced variable bleed valve assemblies. Each variable bleed valve assembly includes a plurality of circumferentially spaced variable bleed valve assemblies. Each variable bleed valve assembly includes a variable bleed valve door that is selectively adjustable through a range of intermediate positions between a closed position and an open position. The variable bleed valve door is configured to maintain any of the intermediate positions. Each variable bleed valve assembly also includes an actuator operatively coupled to the variable bleed valve door. The actuator is configured to selectively adjust a position of the variable bleed valve door through the range of intermediate positions between the closed position and the open position.

21 Claims, 5 Drawing Sheets

(51) Int. Cl.
*F02C 9/18* (2006.01)
*F01D 17/10* (2006.01)
*F16K 1/20* (2006.01)

(52) U.S. Cl.
CPC ...... *F05D 2270/62* (2013.01); *F05D 2270/64* (2013.01); *F05D 2270/65* (2013.01); *F16K 1/2007* (2013.01); *F16K 1/2021* (2013.01)

(58) Field of Classification Search
CPC .... F02C 7/18; F02C 7/185; F02C 9/18; F01D 17/105; F05D 2270/62; F05D 2270/64; F05D 2270/65; F05D 2220/32; F16K 1/2007; F16K 1/2021
See application file for complete search history.

(56) References Cited

U.S. PATENT DOCUMENTS

| | | | | |
|---|---|---|---|---|
| 5,044,153 | A | * | 9/1991 | Mouton ................. F02C 7/052 60/39.093 |
| 5,119,625 | A | | 6/1992 | Glowacki |
| 5,123,240 | A | * | 6/1992 | Frost ....................... F02K 7/075 244/53 B |
| 5,711,111 | A | | 1/1998 | Nyffenegger et al. |
| 5,845,482 | A | * | 12/1998 | Carscallen ........... F01D 17/105 60/785 |
| 6,048,171 | A | * | 4/2000 | Donnelly .............. F01D 17/105 137/601.05 |
| 6,742,324 | B2 | | 6/2004 | Bachelder et al. |
| 6,921,244 | B2 | | 7/2005 | Johnson |
| 7,048,234 | B2 | | 5/2006 | Recksiek et al. |
| 7,594,403 | B2 | | 9/2009 | Cadieux |
| 8,210,800 | B2 | | 7/2012 | Suciu et al. |
| 8,816,671 | B2 | | 8/2014 | Jacoby, Jr. et al. |
| 9,476,362 | B2 | | 10/2016 | Patsouris |
| 2011/0184573 | A1 | | 7/2011 | Colotte et al. |
| 2014/0109589 | A1 | * | 4/2014 | Pritchard, Jr. .......... F02K 3/075 60/779 |
| 2014/0245747 | A1 | * | 9/2014 | Pritchard, Jr. ........ F01D 17/105 60/782 |
| 2017/0058783 | A1 | * | 3/2017 | Tan .......................... F02C 9/18 |

FOREIGN PATENT DOCUMENTS

| | | |
|---|---|---|
| CN | 105626266 A | 6/2016 |
| GB | 2473578 A | 3/2011 |

OTHER PUBLICATIONS

National Intellectual Property Administration, P.R. China, "Second Office Action," dated Jul. 30, 2020 in connection with Chinese Patent Application No. 201810171660.4, 12 pages. English Translation Included.

\* cited by examiner

VARIABLE BLEED VALVE DOOR ASSEMBLY AND SYSTEM FOR GAS TURBINE ENGINES

BACKGROUND OF THE INVENTION

The subject matter disclosed herein relates to gas turbine engines and, more particularly, to a variable bleed valve (VBV) including a plurality of independently actuable VBVs.

At least some turbofan engines include two or more independently rotatable axial flow compressor rotors, such as a low pressure compressor (LPC) and a downstream high pressure compressor (HPC), both of which are utilized to pressurize fluid flow within a common fluid flow path. During operation, it is often desirable to provide some mechanism to bypass or extract a portion of the fluid pressurized by the LPC to prevent aerodynamic efficiency loss from occurring in the LPC as a result of an oversupply of pressurized fluid to the HPC and a resultant back-pressuring of the LPC.

Many known turbofan engines include VBV assemblies for such a purpose. However, conventional VBV assemblies include an annular member commonly referred to as a unison ring. The unison ring is typically coupled to one or more actuators as well as to each of a plurality of VBV assemblies. During operation, the actuators drive the unison ring through a slight rotation. As the unison ring rotates, each VBV assembly opens and closes in tandem. Thus, many conventional VBV assemblies do not include a mechanism for independently actuating each VBV assembly.

BRIEF DESCRIPTION OF THE INVENTION

In one aspect, a variable bleed valve system for use in a turbofan engine includes a plurality of circumferentially spaced variable bleed valve assemblies. Each variable bleed valve assembly includes a variable bleed valve door that is selectively adjustable through a range of intermediate positions between a closed position and an open position. The variable bleed valve door is configured to maintain any of the intermediate positions. Each variable bleed valve assembly also includes an actuator operatively coupled to the variable bleed valve door. The actuator is configured to selectively adjust a position of the variable bleed valve door through the range of intermediate positions between the closed position and the open position.

In another aspect, a turbofan engine includes a core engine case defining a compressor flow duct, a high pressure compressor disposed within the compressor flow duct, and a low pressure compressor disposed axially upstream of the high pressure compressor within the compressor flow duct. A transition duct is defined between the high pressure compressor and the low pressure compressor. The turbofan also includes a plurality of circumferentially spaced variable bleed valve assemblies extending circumferentially about the transition duct. Each variable bleed valve assembly includes a variable bleed valve door that is selectively adjustable through a range of intermediate positions between a closed position and an open position. The variable bleed valve door is configured to maintain any of the intermediate positions. Each variable bleed valve assembly also includes an actuator operatively coupled to the variable bleed valve door. The actuator is configured to selectively adjust a position of the variable bleed valve door through the range of intermediate positions between the closed position and the open position.

In yet another aspect, a variable bleed valve assembly for use in a turbofan engine includes a variable bleed valve door that is selectively adjustable through a range of intermediate positions between a closed position and an open position. The variable bleed valve door is configured to maintain any of the intermediate positions. Each variable bleed valve assembly also includes an actuator operatively coupled to the variable bleed valve door. The actuator is configured to selectively adjust a position of the variable bleed valve door through the range of intermediate positions between the closed position and the open position.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to a variable bleed valve (VBV) assembly and, more particularly, to a VBV assembly that is selectively adjustable through a range of positions between an open position and a closed position and that is independently driven by a dedicated actuator.

Although a VBV assembly is described below with respect to VBV doors that open radially outward, it will be understood that the VBV assembly may, in various embodiments, include inwardly opening VBV doors, such as VBV doors that open radially inward within a transition duct, as described in detail below.

Figure 1:
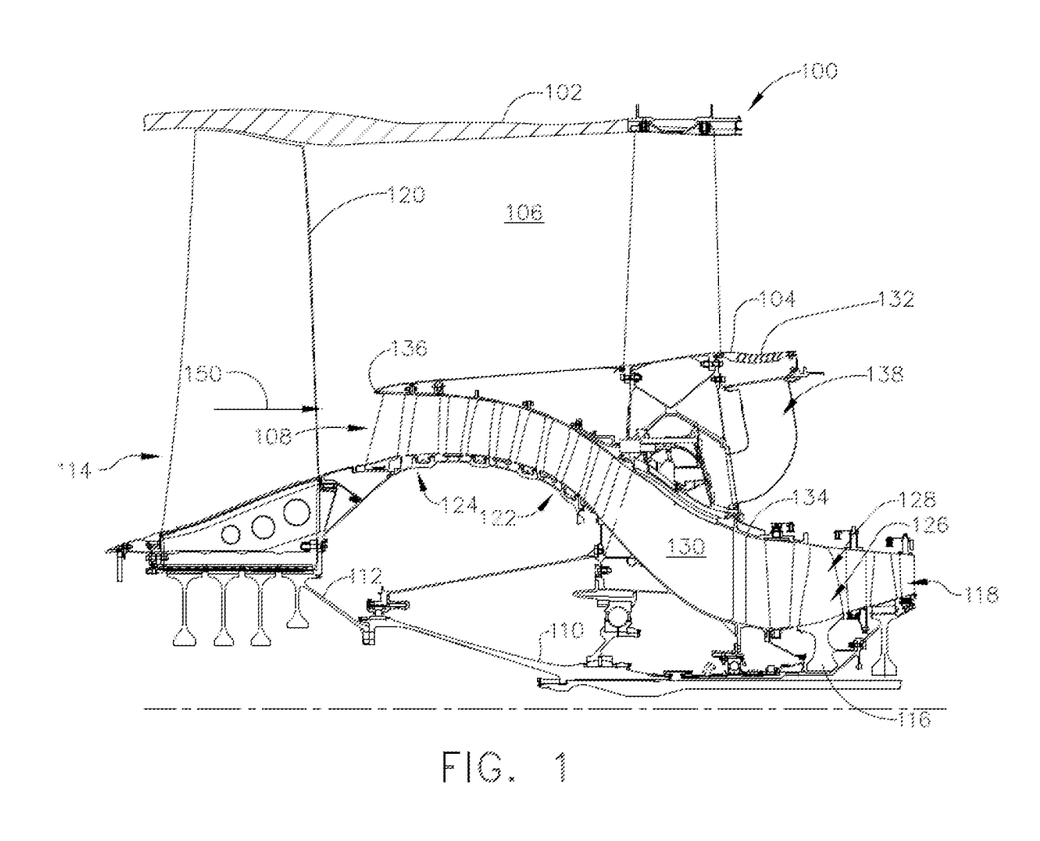
FIG. 1 is a cross-sectional view of a forward portion of a turbofan engine.

FIG. 1 is a cross-sectional view of a forward portion of a turbofan engine 100. Forward portion of turbofan engine 100 includes a fan case 102 and a core engine case 104. Fan case 102 is disposed radially outward of fan case 102. A bypass air duct 106 is defined between fan case 102 and core engine case 104.

Core engine case 104 defines at least a portion of a compressor flow duct 108. Core engine case also supports an inner shaft 110, which extends generally coaxially within turbofan engine 100 and carries an upstream fan rotor 112 at an upstream end 114 and a downstream fan rotor 116 at a downstream end 118. Fan rotors 112 and 116 are independently rotatable.

Fan rotor 112 includes a stage of long fan blades 120 and a plurality of axially downstream spaced stages of smaller fan blades 122. Fan blades 120 extend across bypass air duct 106, and fan blades 122 extend within compressor flow duct 108 to define a low pressure compressor (LPC) 124. Similarly, fan rotor 116 includes plurality of fan blades 126, which extend within compressor flow duct 108 to define a high pressure compressor (HPC) 128. A transition duct 130 is defined within compressor flow duct 108 between LPC 124 and HPC 128.

In operation, a portion of fluid pressurized by fan blades 120 is exhausted from turbofan engine 100 to generate thrust, and a portion 150 enters compressor flow duct 108 for further pressurization by LPC 124 and HPC 128. Downstream of HPC 128, the pressurized fluid is combusted in the presence of a hydrocarbon fuel to produce additional thrust as well as to drive fan rotors 112 and 116. However, because fan rotors 112 and 116 are independently rotatable, under certain operating conditions, such as may occur during deceleration of turbofan engine 100, the flow rate of pressurized fluid discharged by LPC 124 may exceed the flow rate required by HPC 128. Under such conditions, HPC 128 may exert a back pressure on LPC 124, which may adversely affect the efficiency of turbofan engine 100.

Accordingly, in the exemplary embodiment, core engine case 104 includes a bypass air duct surface 132 and a compressor flow duct surface 134. At upstream end 114, bypass air duct surface 132 and compressor flow duct surface 134 meet at an inlet 136 and increase in radial separation as each surface 132 and 134 extends aft over transition duct 130 to define a bleed duct 138 between bypass air duct surface 132 and compressor flow duct surface 134.

Figure 2:
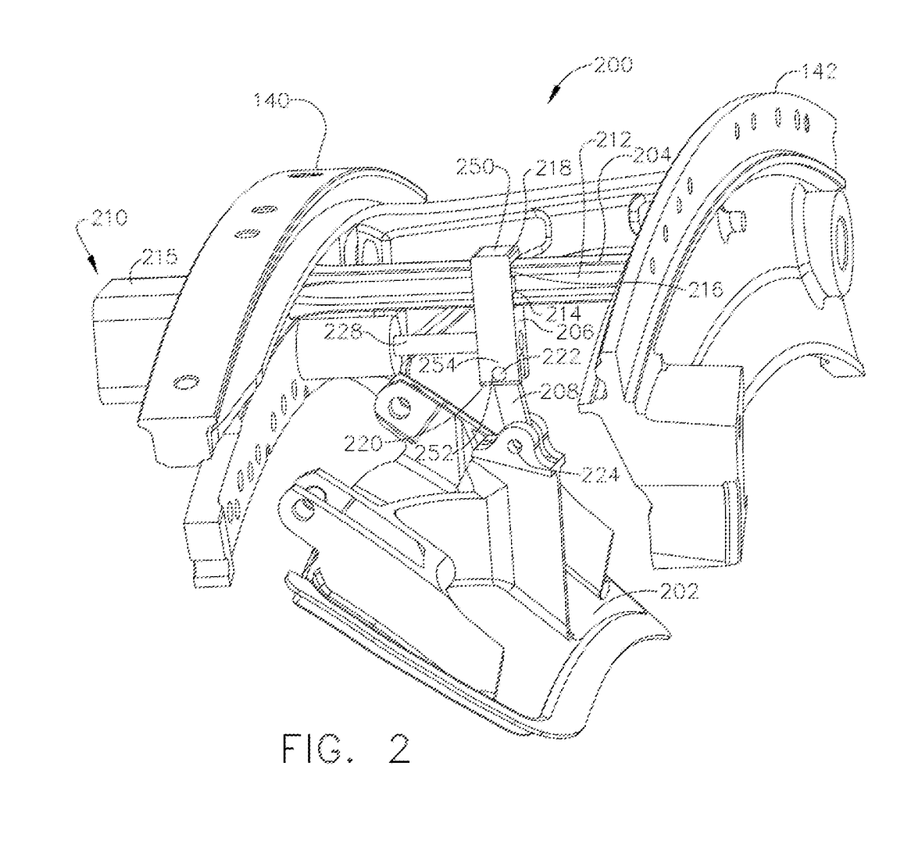
FIG. 2 is a side view of a variable bleed valve assembly of the turbofan engine of FIG. 1.
Figure 3:
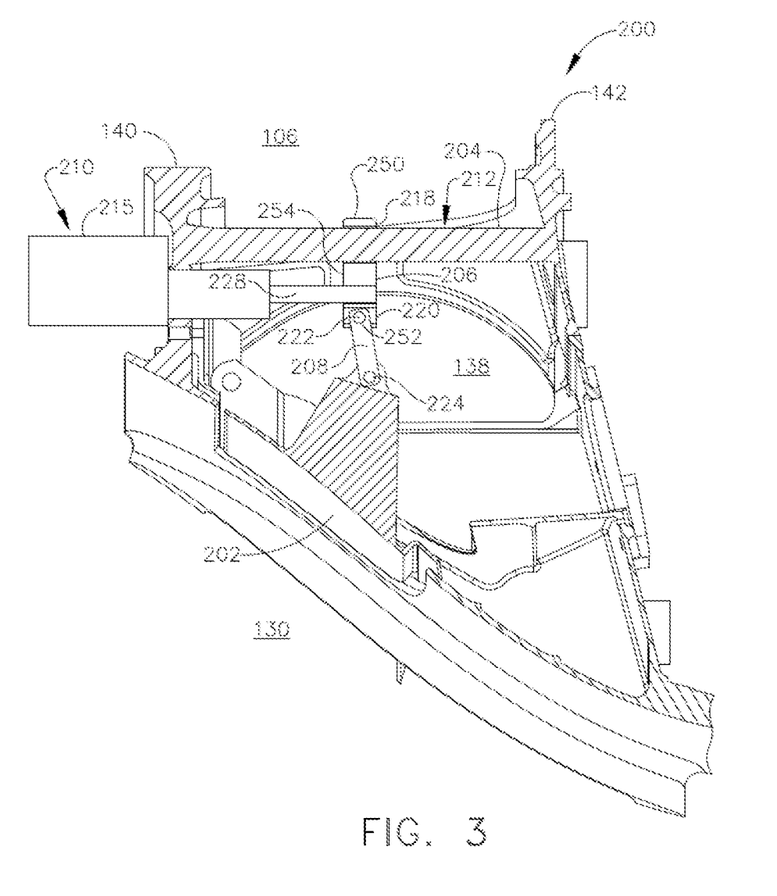
FIG. 3 is a perspective view of the variable bleed valve assembly of FIG. 2.

FIG. 2 is a side view of a VBV assembly 200 of turbofan engine 100 (shown at FIG. 1), and FIG. 3 is a perspective view of variable bleed valve assembly 200. With attention to both figures, VBV assembly 200 is mounted within bleed duct 138 of core engine case 104. Specifically, VBV assembly 200 is mounted within bleed duct 138 between a first bleed duct wall 140 and a second bleed duct wall 142. As described in greater detail below, VBV assembly 200 may be selectively adjusted to vent compressed air flowing within transition duct 130, through bleed duct 138, into bypass air duct 106, such that the back pressure exerted by HPC 128 on LPC 124 is reduced.

VBV assembly 200 includes a VBV door 202, a support member 204, a translating member 206, a coupling member 208, and an actuator 210. In the exemplary embodiment, support member 204 includes an I-shaped translating surface 212 and extends generally axially within bleed duct 138 between first bleed duct wall 140 and second bleed duct wall 142.

Translating member 206 includes a first end 250, a second end 252, and a body 254 extending therebetween. At first end 250, translating member 206 also includes a substantially I-shaped inner surface 214 that defines a substantially I-shaped passage 216 within translating member 206. I-shaped passage 216 is configured to slidably couple over I-shaped translating surface 212 of support member 204. Translating member 206 is thus coupled around support member 204 at a first end 218.

At a second end 220, translating member 206 is coupled to coupling member 208. Specifically, at second end 220, translating member 206 is coupled to coupling member 208 by a first joint 222. In the exemplary embodiment, first joint 222 is a revolute joint. However, any joint that facilitates hinged motion between translating member 206 and coupling member 208 may be used.

Coupling member 208 is coupled at a second joint 224 to VBV door 202. In the exemplary embodiment, second joint 224 is a revolute joint. However, in alternative embodiments, second joint 224 is any joint that facilitates hinged motion between coupling member 208 and VBV door 202.

Actuator 210 includes an actuator motor 215 and an actuation piston or actuation rod 228 that is driven by actuator motor 215. Actuator 210 is coupled to first bleed duct wall 140 and mounted such that actuation rod 228 translates axially parallel to support member 204 during operation.

In operation, VBV door 202 is adjustable or pivotable between an open, or retracted position, and a closed, or deployed, position. VBV door 202 is also selectively adjustable or pivotable through a range of positions, such as through a range of intermediate positions, between the closed position and the open position.

To adjust VBV door 202, actuator 210 drives translating member towards downstream end 118 or pulls translating member towards upstream end 114. Specifically, to open VBV door 202, actuator motor 215 pulls actuation rod 228 forward, which pulls translating member 206, to which it is coupled, forward along support member 204. Likewise, to close VBV door 202, actuator motor 215 drives actuation rod 228 aft, which drives translating member 206 aft along support member 204. As translating member 206 moves forward and aft along support member 204, translating member 206 pushes and pulls coupling member 208 forward and aft, and as coupling member 208 moves forward and aft, coupling member 208 pushes and pulls VBV door 202 radially inward and radially outward, respectively. To deploy VBV door 202 to an intermediate position, actuator 210 simply moves translating member 206 to a desired position along support member 204.

Figure 4:
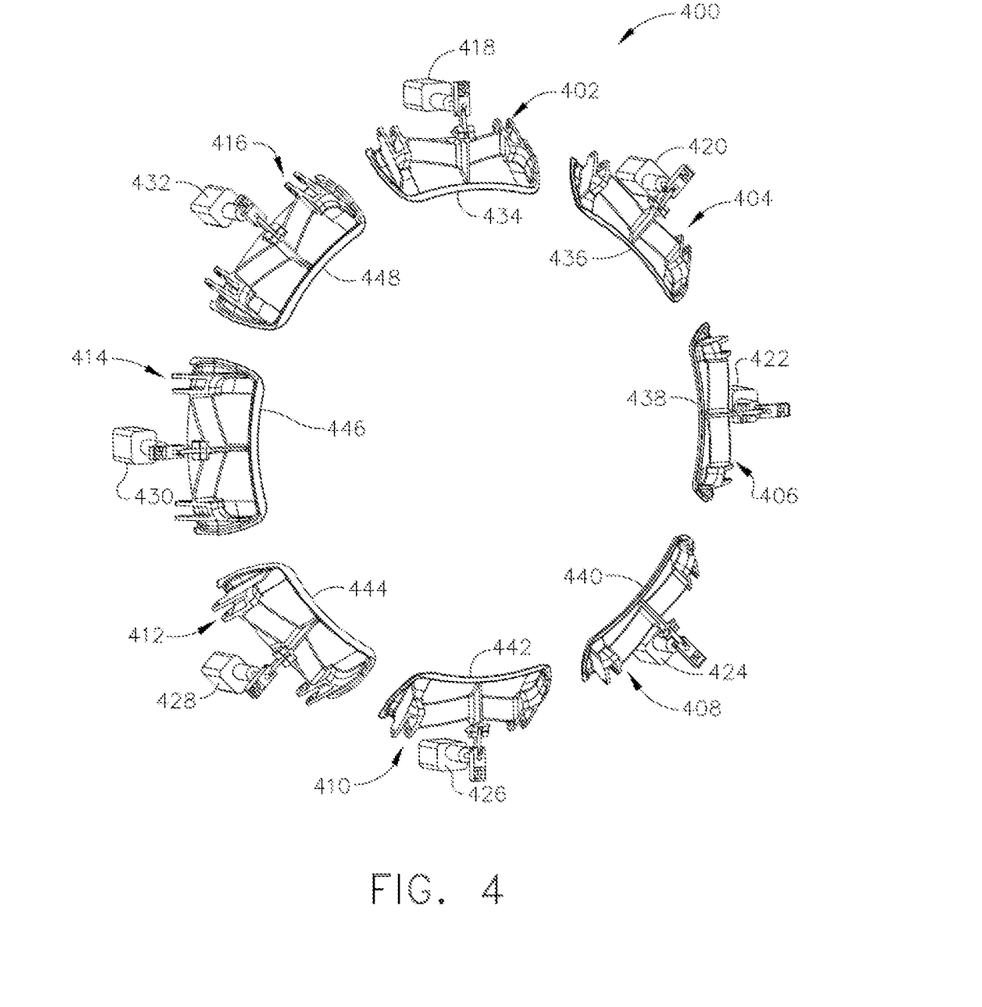
FIG. 4 is a perspective view of a variable bleed valve system of the turbofan engine of FIG. 1.

FIG. 4 is a perspective view of an exemplary VBV system 400 of turbofan engine 100 (shown at FIG. 1). VBV system 400 includes a plurality of VBV assemblies, such as VBV assemblies 402, 404, 406, 408, 410, 412, 414, and 416. Each VBV assembly 402-416 is identical to VBV assembly 200 (described above). Each VBV assembly 402-418 thus includes each of the components described above with respect to VBV assembly 200. For example, each VBV assembly 402-416 includes a dedicated actuator, such as an actuator 418, 420, 422, 424, 426, 428, 430, and 432. Each VBV assembly also includes a VBV door, such as a VBV door 434, 436, 438, 440, 442, 444, 446, and 448. Although eight VBV assemblies 402-416 are shown, in alternative embodiments, any suitable number of VBV assemblies may be used.

Each VBV assembly 402-416 is arranged circumferentially about a portion of transition duct 130 and may be selectively opened and closed to vent air flowing within transition duct 130, through a corresponding bleed duct, to bypass air duct 106. As described above, each VBV assembly 402-416 is independently driven by an associated, or dedicated, actuator, such as one of actuators 418-432, respectively. Specifically, in the exemplary embodiment, each VBV assembly 402-416 is driven, in a one to one relationship, by a corresponding actuator 418-432. Thus, each VBV assembly 402-416 includes a dedicated actuator 418-432 that only drives a single VBV door 434-448.

Figure 5:
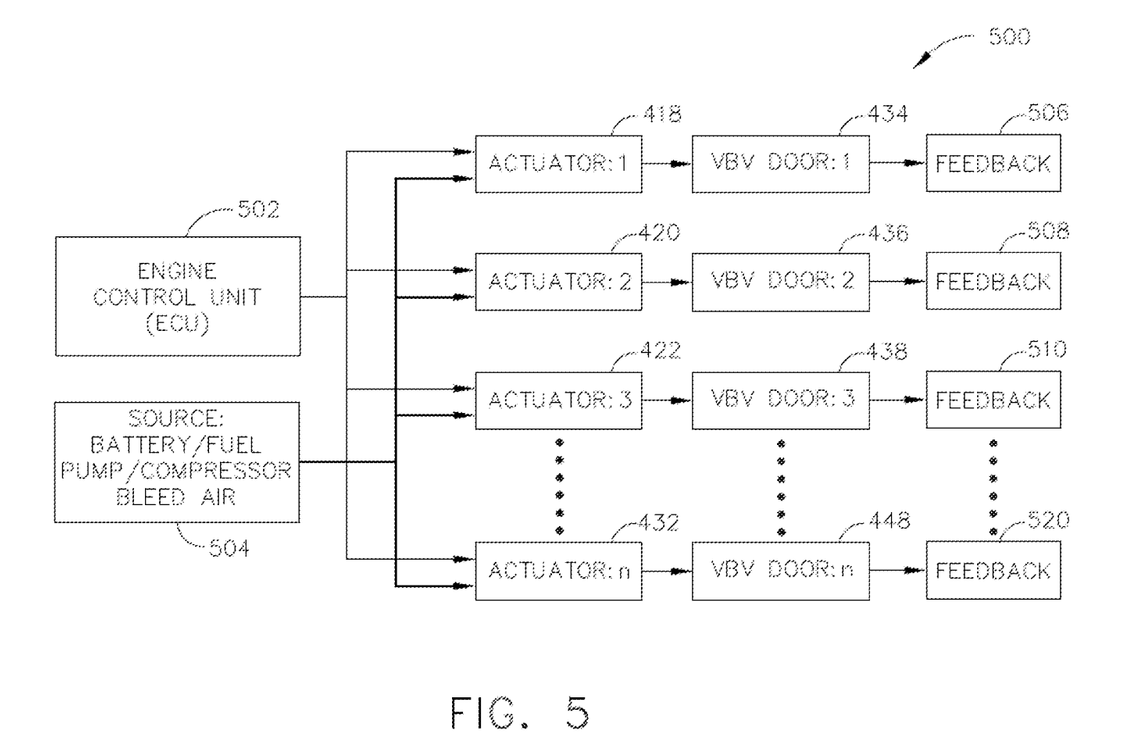
FIG. 5 is a block diagram of an exemplary control system of the variable bleed valve system of FIG. 4.

FIG. 5 is a block diagram of an exemplary control system 500 of the VBV system 400. Control system 500 includes an engine control unit (ECU) 502, a power source 504, and a plurality of VBV actuators, such as VBV actuators 418-432, each of which is coupled, as described above, to a VBV door, such as one of VBV doors 434-448. Power source 504 provides electrical power to each VBV actuator 418-432. In other embodiments, actuators 418-432 are powered by pneumatics, hydraulics, and the like. In such embodiments, ECU 502 controls a respective actuator control valve. Also in such embodiments, power source 504 provides pressurized air or hydraulic fluid to actuators 418-432.

In the exemplary embodiment, ECU 502 is configured to control each of VBV actuators 418-432 to provide a control signal to each VBV door 434-448. ECU 502 is also configured to receive a feedback signal, such as a feedback signal from each VBV actuator 418-432. The feedback signal may also be an actuator position signal or a valve position signal generated by a position sensor, such as, for example, one of position sensors 506, 508, 510, and/or 520. A position sensor, such as position sensors 506-520, may be coupled to each of VBV doors 434-448 and/or to each of VBV actuators 418-432. In addition, position sensors 506-520 may be any sensor capable of sensing a position of a VBV door to which it is coupled, such as one of VBV doors 434-448. For example, position sensors 506-520 may be linear voltage differential transformers (LVDTs). Where position sensors 506-520 generate a feedback signal, the feedback signal may be provided to a respective VBV actuator 418-432 and/or to ECU 502.

ECU 502 analyzes the feedback signal to provide an updated or adjusted control signal to one or more VBV actuator 418-432. For instance, as described in greater detail below, ECU 502 may receive a feedback signal from VBV actuator 418 indicating that VBV door 434 is stuck in an intermediate position between an open and closed position. ECU 502 may, in response, provide an updated control signal to one of VBV actuators 420-432 to adjust a position of one of VBV doors 436-448 driven by VBV actuator 420-432, such that airflow through transition duct 130 is stabilized or otherwise desirably affected.

Accordingly, during operation, each VBV assembly 402-416 is independently actuated by ECU 502, such that each VBV door 434-448 is independently opened and closed. VBV doors 434-448 are further selectively adjustable or selectively pivotable between a closed position and an open position, such that VBV doors 434-448 are able to move to one or more intermediate positions between the closed position and the open position.

As described above, in a closed position, each VBV door 434-438 is deployed radially inward, such that the VBV doors 434-448 form at least a circumferential portion of transition duct 130. In an open position, each VBV door 434-448 is drawn or retracted radially outward, such that the VBV doors 434-448 facilitate airflow between transition duct 130 and bypass air duct 106 through a bleed duct, such as bleed duct 138. In other words, when VBV doors 434-448 are at least partially retracted, air flowing within transition duct 130 is able to flow through a bleed duct, such as bleed duct 138, into bypass air duct 106, which reduces a flow pressure within transition duct 130.

In some embodiments, VBV doors 434-448 may be independently adjusted during operation to compensate for flow irregularities within transition duct 130. In particular, in the event that a particular VBV door 434-448 becomes stuck in an off normal position (e.g., an open position, an intermediate position, or a closed position) one or more other VBV doors 434-448 may be adjusted to compensate. For example, if one of VBV doors 434-448 becomes stuck or is otherwise disabled, a diametrically opposed VBV door 434-448 may be adjusted to a similar position to stabilize airflow within transition duct 130. Other VBV combinations may also be used.

Embodiments of the VBV assembly and system, as described above, facilitate independent actuation of a plurality of circumferentially spaced VBV assemblies. As each VBV assembly is actuated, a corresponding VBV door is opened and closed through a range of positions between an open, or retracted position, and a closed, or deployed, position. As each VBV door moves towards the open position, air is allowed to flow through a bleed duct defined between the transition duct and a bypass air duct, such that a fluid pressure within the transition duct is maintained in accordance with engine operating requirements.

Exemplary technical effects of the VBV assembly and system described herein include, for example: (a) independent actuation of each of a plurality of circumferentially spaced VBV doors by a plurality of dedicated actuators; (b) variable actuation of each VBV assembly through a range of positions between an open position and a closed position; and (c) variable airflow through a bleed duct as each VBV assembly is actuated and moves toward the open position.

Exemplary embodiments of a variable bleed valve system and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where a variable bleed valve system is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A variable bleed valve system for use in a turbofan engine, said variable bleed valve system comprising:
   a plurality of circumferentially spaced variable bleed valve assemblies, each variable bleed valve assembly of said plurality of variable bleed valve assemblies comprising:
   a variable bleed valve door selectively adjustable through a range of intermediate positions between a closed position and an open position, said variable bleed valve door configured to maintain any of the intermediate positions; and
   an actuator operatively coupled to said variable bleed valve door, said actuator configured to selectively adjust a position of said variable bleed valve door through the range of intermediate positions between the closed position and the open position, the position of said variable bleed valve door independently adjustable with respect to positions of each other variable bleed valve door of said plurality of variable bleed valve assemblies.

2. The variable bleed valve system of claim 1, wherein each variable bleed valve assembly of said plurality of variable bleed valve assemblies further comprises:
   a support member;
   a translating member comprising a first end, a second end, and a body extending therebetween, said first end slidably coupled on said support member; and
   a coupling member pivotally coupled between said second end of said translating member and said variable bleed valve door.

3. The variable bleed valve system of claim 2, wherein said actuator is configured to translate said translating member on said support member.

4. The variable bleed valve system of claim 2, wherein said coupling member is coupled to said translating member by a first joint and to said variable bleed valve door by a second joint.

5. The variable bleed valve system of claim 4, wherein said first joint and said second joint are revolute joints.

6. The variable bleed valve system of claim 1, wherein said actuator drives a single variable bleed valve door of said plurality of variable bleed valve assemblies.

7. The variable bleed valve system of claim 1, wherein a position of one of said plurality of variable bleed valve assemblies is adjustable to compensate for an off normal position of one or more variable bleed valve assemblies.

8. A turbofan engine comprising:
   a core engine case defining a compressor flow duct;
   a high pressure compressor disposed within the compressor flow duct;
   a low pressure compressor disposed axially upstream of said high pressure compressor;
   a transition duct extending between said high pressure compressor and said low pressure compressor;
   a plurality of circumferentially spaced variable bleed valve assemblies extending circumferentially about said transition duct, each variable bleed valve assembly of said plurality of variable bleed valve assemblies comprising:
   a variable bleed valve door selectively adjustable through a range of intermediate positions between a closed position and an open position, said variable bleed valve door configured to maintain any of the intermediate positions; and
   an actuator operatively coupled to said variable bleed valve door, said actuator configured to selectively adjust a position of said variable bleed valve door through the range of intermediate positions between the closed position and the open position, the position of said variable bleed valve door independently adjustable with respect to positions of each other variable bleed valve door of said plurality of variable bleed valve assemblies.

9. The turbofan engine of claim 8, wherein said core engine case further comprises:
   a compressor flow duct surface and a bypass air duct surface disposed radially outward of said compressor flow duct surface, and wherein a bleed duct is defined between said compressor flow duct surface and said bypass air duct surface.

10. The turbofan engine of claim 9, wherein each variable bleed valve assembly is disposed within the bleed duct.

11. The turbofan engine of claim 8, wherein each variable bleed valve assembly of said plurality of variable bleed valve assemblies further comprises:
    a support member;
    a translating member comprising a first end, a second end, and a body extending therebetween, said first end slidably coupled on said support member; and
    a coupling member pivotally coupled between said second end of said translating member and said variable bleed valve door.

12. The turbofan engine of claim 11, wherein said actuator is configured to translate said translating member on said support member.

13. The turbofan engine of claim 11, wherein said coupling member is coupled to said translating member by a first joint and to said variable bleed valve door by a second joint.

14. The turbofan engine of claim 8, wherein said actuator drives a single variable bleed valve door of said plurality of variable bleed valve assemblies.

15. The turbofan engine of claim 8, wherein one of said plurality of variable bleed valve assemblies is adjustable to compensate for an off normal position of one or more variable bleed valve assemblies.

16. A variable bleed valve variable bleed valve assembly for use in a turbofan engine, the variable bleed valve assembly comprising:
    a variable bleed valve door selectively adjustable through a range of intermediate positions between a closed position and an open position, said variable bleed valve door configured to maintain any of the intermediate positions; and
    an actuator operatively coupled to said variable bleed valve door, said actuator configured to selectively adjust a position of said variable bleed valve door through the range of intermediate positions between the closed position and the open position, the position of said variable bleed valve door independently adjustable with respect to positions of each other variable bleed valve door.

17. The variable bleed valve assembly of claim 16, wherein said variable bleed valve assembly further comprises:
    a support member;

a translating member comprising a first end, a second end, and a body extending therebetween, said first end slidably coupled on said support member; and a coupling member pivotally coupled between said second end of said translating member and said variable bleed valve door.

18. The variable bleed valve assembly of claim 17, wherein said actuator is configured to translate said translating member on said support member.

19. The variable bleed valve assembly of claim 17, wherein said coupling member is coupled to said translating member by a first joint and to said variable bleed valve door by a second joint.

20. The variable bleed valve assembly of claim 16, wherein said actuator drives a single variable bleed valve door of a plurality of variable bleed valve assemblies.

21. The variable bleed valve assembly of claim 17, wherein said variable bleed valve door is configured to open at least one of radially inward or radially outward.

* * * * *